United States Patent Office 3,460,232
Patented Aug. 12, 1969

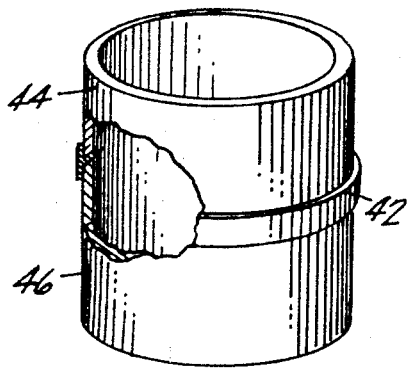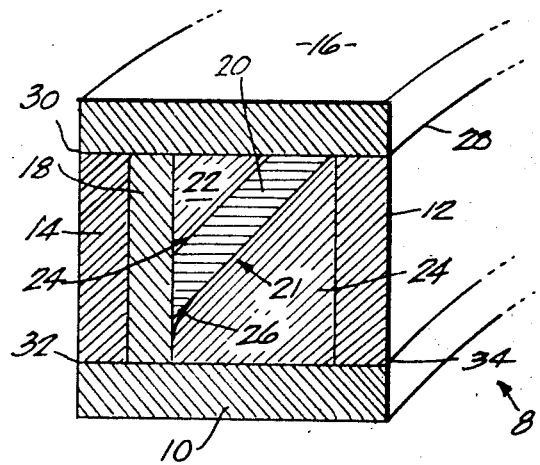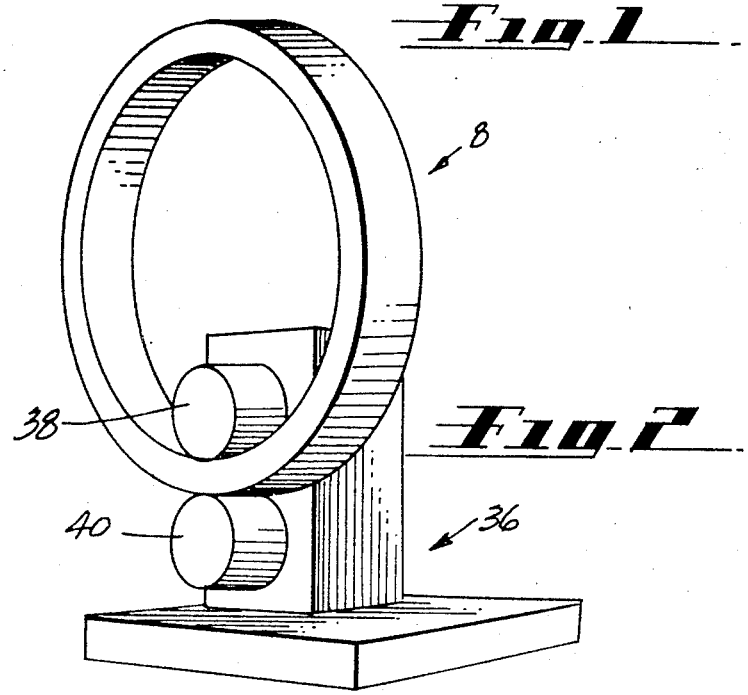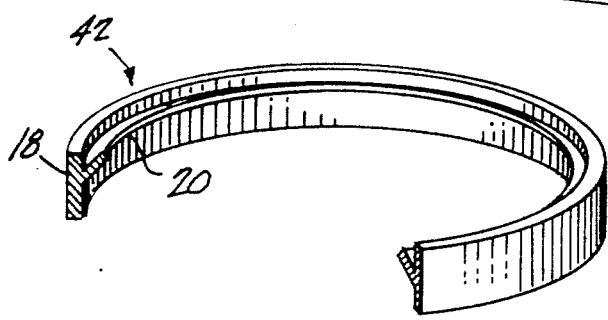

3,460,232
ROLL-WELDED RING FORMING PROCESS
Richard T. Pfaffenberger, Manhattan Beach, and Leonard R. Van Horik, Long Beach, Calif., assignors, by mesne assignments, to McDonnell Douglas Corporation, Santa Monica, Calif., a corporation of Maryland
Filed Oct. 24, 1965, Ser. No. 504,876
Int. Cl. B21h *1/00;* B23k *31/06*
U.S. Cl. 29—423                                    4 Claims

ABSTRACT OF THE DISCLOSURE

A roll-welded ring forming process for fabricating large structural ring segments. A composite ring structure is sealed in a ring packed which is subjected to rolling under heat and pressure to reduce its size and to bond abutting parts of the ring into an autogenous ring structure.

Large structural rings are used to join cylindrical and/or conical and/or spherical sections together. These rings may be formed as rolled ring forgings, machined to shape, or they may consist of sections formed to shape and welded together. These rings may be made of a ductile material, such as aluminum, for example, with the use of a ring roller. Lukins Steel in Milwaukee and Edgewater Steel in Pittsburgh are two companies that have the capability of making such rings which typically have a rectangular or a flat, thin cross-section or other relatively simple cross-sectional configuration. However, there is no known process, until the present invention, that would produce a continuous ring of nearly correct Y or T cross-section requiring only minor machining, wherein a complex cross-section configuration was accomplished by roll-welding to form a continuous integrally stiffened ring structure. The process comprising the present invention is capable of producing a complex cross-sectional configuration of a continuous ring.

It is therefore an object of this invention to provide for a process for making a continuous ring having a complex cross-sectional configuration.

It is aonther object of the invention to provide for a process for the roll-weld bonding of component sections of a rolled ring forging wherein the welding of the sections is accomplished during the rolling process.

Other objects will become more apparent with a better understanding of the invention, reference now being had to the drawings wherein:

FIGURE 1 is a perspective view, partly in section, of the roll-weld pack containing the ring to be formed, FIGURE 2 is a schematic view showing the reduction rolling with an industrial ring roller, FIGURE 3 is a perspective view partly in section of the finished rolled ring, and FIGURE 4 is a perspective view of two sections of a cylinder joined together by a ring, with parts broken away to more clearly shown the cross-sectional configuration of the ring.

A method of producing ribbed metal sandwich structures was inverted by Robert I. Jaffee and Patent No. 3,044,160 was issued thereon July 17, 1962. This patent related to the method of producing ribbed metal sandwich structures of light-weight, high strength material which were particularly useful at elevated temperatures. This required the use of metal materials such as titanium, for example, which is particularly difficult to work, form and bond. With the encapsulation of the materials within a pack and use of filler material between the ribbed stiffening members, the pack presents a completely filled package which may then be subjected to suitable heat and pressure to provide an autogenous weld between all of the contacting titanium parts. The filler material, typically, was of steel or some other material that could be removed either mechanically or by chemical dissolution. It is the adaptation of this technigue of roll-welding that is utilized in the practice of the present invention.

Reference is now made to FIG. 1 which shows a portion of ring pack 8. This includes a bottom cover ring 10, an inner cover ring 12, an outer cover ring 14, and a top cover ring 16. These preferably are of steel and form the covers of the pack used in fabricating the ring. Within this pack is positioned a cylindrical leg section 18 and a Y section 20, together forming the desired configuration of the ring 21 to be made. Filler material 22 and 24 are formed to take up all other space within the pack, with the exception of small voids 24 and 26 adjacent the points of contact between the cylindrical leg section 18 and the Y section 20. These voids then permit the flow of titanium from sections 18, 20 to thereby provide for fillets at the point of bonding. After these structures have first been made and before they are assembled, they are subjected to an etching-type cleaning which removes a small portion of the surface metal for optimum cleanliness. In the case of titanium, a nitro-hydrofluoric acid bath may be used and for aluminum a sodium-hydroxide bath is preferable.

After the pack has been assembled with the ring parts and filler material filling all spaces therein, the pack is sealed along lines 28, 30, 32 and 34 by welding and evacuated. The pack is then backfilled with an inert gas, such as argon to lower the internal pressure of any reactive gases present. Preferably the internal pressure should be on the order of $10^{-3}$ torr.

After the pack is heated it is rolled with a ring rolling machine 36 between two rollers, 38 and 40, to thereby reduce the thickness of the ring. The ring may be reheated when it becomes too cool to work or it may be subjected to a continuous rolling and heating environment. This rolling process is continued until the desired size is reached. Usually, there is a two or three to one reduction in size. The rolling is done at atmospheric pressure, the time, pressure and temperature varying with the type of material being welded. The preferred rolling temperature is that of the $\beta$-transis of the material minus approximately 100° F. This temperature is just below that at which an undesirable phase change occurs in the crystalline structure of the material. In the case of aluminum alloys this temperature is between 600° F. and 900° F. In the case of titanium alloys it varies between 1500° F. and 1800° F. whereas for columbium alloys the temperature is between 2000° F. and 2500° F., depending upon which alloy is used. The time required and the rolling pressure involved depends upon the reduction of the thickness of the pack required or desired. For that reason no estimate example is meaningful.

Before the pack is broken open to expose the ring that now has all contacting parts welded together in an autogenous weld in the manner taught in the Jaffee patent, it sometimes is desirable to recrystallize the internal part structure. This may be done by a heat-treating type operation and, depending upon the type of alloy used, it may be heated and quenched or cooled in oil, water, air or may become age-hardened, all while the part is sealed within the pack to thus avoid oxidation.

After the recrystallization has been accomplished, the pack may be then broken open either mechanically or chemically and the filler material removed. Under certain conditions, the filler material may be mechanically broken away from the part and under other conditions it must be chemically removed. After the removal of all material not comprising the desired part, the part is then etch-cleaned, after which it becomes a finished part, an integrally stiffened structural ring. This is shown in FIG. 3 as a Y-shaped ring 42. This ring 42 is shown in FIG. 4 as a means for attaching cylinder 44 to cylinder 46.

An integrally stiffened structural ring formed in accordance with the present invention has the advantage of having filletted joints which eliminates stress concentration at these joints. The joint material has wrought material properties, that is, it has been made stronger through working. The ring eliminates machining and welding which inherently has leak paths and a possibility of structural failure. It has consistent material properties throughout the structure and therefore less safety factors need to be applied to the finished design. This, then, permits a lower weight design for the same structural integrity of the structure.

Having thus described a preferred embodiment in the practice of the present invention, it is to be understood that there are other modifications and variations that will readily become apparent to one skilled in the art, and that it is to be understood that these variations are to be considered as a part of the present invention as defined by the appended claims.

What is claimed is:

1. A roll-welded ring forming process comprising the steps of:
   making a ring shaped pack having ring parts in abutting contact therein for welding together, filling said pack with a filler material of a metal different from that of said ring parts,
   subjecting said pack to suitable heat and reducing the thickness thereof with a ring roller to weld the abutting ring parts together,
   open said pack, and
   removing said filler material from around said ring parts.

2. The roll-welded ring forming process as in claim 1 wherein the pack is heated to the β-transis temperature of the metal of the ring parts minus approximately 100° F.

3. A roll-welded ring forming process comprising the steps of:
   making bottom, top, outer and inner cover rings which when welded together form a sealed pack,
   placing ring parts to be welded together in abutting relationship within said pack,
   filling all void spaces within said pack with a filler material of a metal other than that of the ring parts,
   subjecting said pack to suitable heat and reducing the thickness thereof with a ring roller under appropriate pressure to thereby weld said ring parts together,
   open said pack, and
   removing said filler material from around said ring parts.

4. The method of roll-welding structural parts comprising the steps of:
   forming a pack for containing parts to be welded together,
   placing said parts in abutting relationship with said pack,
   filling void spaces around said parts with a filler material of a metal other than that of said parts,
   providing small voids adjacent the points of contact between abutting parts,
   sealing said pack and reducing pressure therein,
   subjecting said pack to suitable heat and pressure to weld said parts together and to cause metal from said parts to flow into said voids to provide for fillets at the welded area.

References Cited

UNITED STATES PATENTS

| | | | |
|---|---|---|---|
| 3,044,160 | 7/1962 | Jaffee | 29—455 X |
| 3,186,083 | 6/1965 | Wright | 29—470.9 |

JOHN F. CAMPBELL, Primary Examiner

J. L. CLINE, Assistant Examiner

U.S. Cl. X.R.

29—497